(12) United States Patent
Brossard et al.

(10) Patent No.: US 11,403,298 B1
(45) Date of Patent: Aug. 2, 2022

(54) EXTENDING DATABASE EXTERNAL FUNCTIONS WITH USER-DEFINED FUNCTIONS

(71) Applicant: Snowflake Inc., Bozeman, MT (US)

(72) Inventors: Elliott Brossard, Kirkland, WA (US); Srilakshmi Chintala, Seattle, WA (US); Istvan Cseri, Seattle, WA (US); Rodger N. Kline, Bellevue, WA (US); Nitya Kumar Sharma, Bellevue, WA (US); Igor Zinkovsky, Redmond, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/514,095

(22) Filed: Oct. 29, 2021

(51) Int. Cl.
*G06F 16/00* (2019.01)
*G06F 16/2455* (2019.01)
*G06F 16/25* (2019.01)
*G06F 16/27* (2019.01)

(52) U.S. Cl.
CPC ...... *G06F 16/24564* (2019.01); *G06F 16/258* (2019.01); *G06F 16/27* (2019.01)

(58) Field of Classification Search
CPC ... G06F 16/24564; G06F 16/27; G06F 16/258
See application file for complete search history.

(56) References Cited

U.S. PATENT DOCUMENTS

| | | | |
|---|---|---|---|
| 7,010,612 B1* | 3/2006 | Si | H03M 9/00 370/395.62 |
| 2002/0016814 A1* | 2/2002 | Convent | G06F 9/465 709/203 |
| 2003/0093436 A1* | 5/2003 | Brown | G06F 16/24553 |
| 2003/0217044 A1* | 11/2003 | Zhang | G06F 9/546 |
| 2004/0045005 A1* | 3/2004 | Karakashian | H04L 67/02 719/310 |

* cited by examiner

*Primary Examiner* — Khanh B Pham
(74) *Attorney, Agent, or Firm* — Schwegman Lundberg & Woessner, P.A.

(57) ABSTRACT

An external function system can be implemented on a database to perform processing on one or more external network services. The external function system can comprise a particular external function for a particular external service, an outbound serializer function, and an inbound serializer function that are linked with the particular external function. The outbound serializer function can be configured to transform the data of a query from a database format to a different format of the particular external network service. The inbound deserializer function can be configured to receive data returned from the external service and transform the data to the format of the database.

30 Claims, 8 Drawing Sheets

EXTENDING DATABASE EXTERNAL FUNCTIONS WITH USER-DEFINED FUNCTIONS

TECHNICAL FIELD

Embodiments of the disclosure relate generally to a network-based database system and, more specifically, to using database functions and network services.

BACKGROUND

Data can be uploaded to a database and access to the database can be provided through a network interface. More recently, cloud database services have risen in popularity due to the ease with which new database instances can be created to store data. While the new cloud database services allow databases to be easily created, the cloud database services create new issues with regard to data interfaces between different systems. For instance, it can be difficult to manage data formats between the database and different network services in a scalable way that does not incur prohibitive computational and network overhead.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
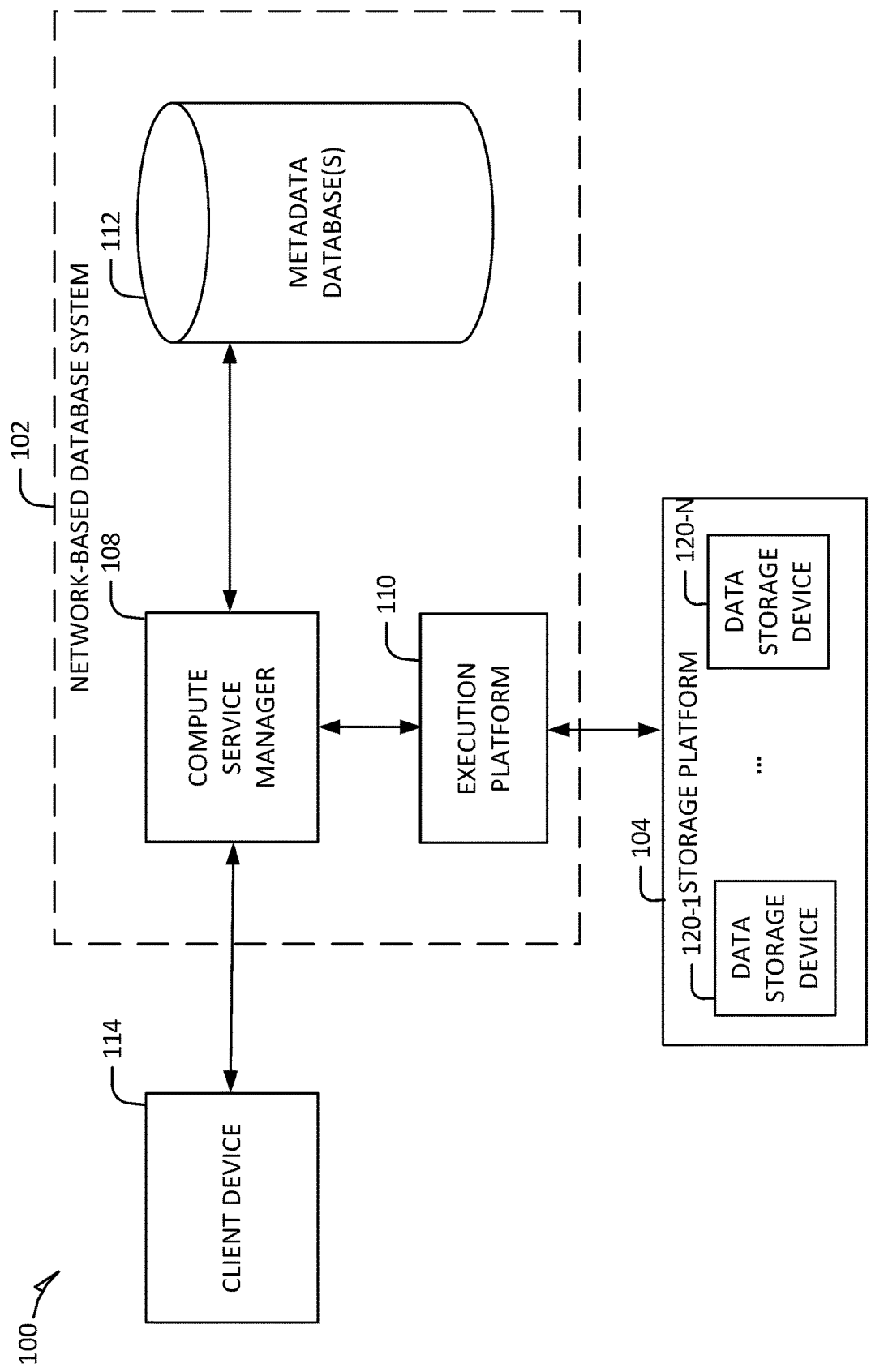
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As discussed, it can be difficult to interface data in a database with different external services. In some example embodiments, a distributed database can implement an external function for processing of database data using an external service. In some example embodiments, the external function is a type of UDF of the database system; however, unlike other UDFs of the database system (e.g., an outbound serializer UDF, an inbound deserializer UDF, as discussed below), the external function does not contain its own code, and instead, the external function calls code that is stored and executed outside the database (e.g., on the external network service) In some example embodiments, inside the database, the external function is stored as a database object that contains information that the database uses to call the external service. For example, the stored information includes a URL of the proxy service that relays information to and from the external service. In some example embodiments, the stored information is specified in a CREATE EXTERNAL FUNCTION command. In some example embodiments, the database object that represents the external function is created in a specific database of the database system and has a specific schema. In some example embodiments, the external function is called using dot notation to represent the fully-qualified name (e.g., "select my_DB.my_schema.my_extFunction(col1) from table1;"), which is a database function that calls code that is executed outside the database system (e.g., remotely, for processing on a third-party network service). In some example embodiments, the remotely executed code can be relayed through a proxy service (e.g., HTTP gateway configured to interface with the external service API). The data of the external service may need to be translated from the data format of the database to the data format of the external service with which the database is in communication. The translation occurs in both directions. For example, to utilize an external service (e.g., sentiment detection, language translation, data analysis services) a query is received on the database system and the corresponding data of the query is translated from a first proprietary format used by the database to a second proprietary format used by the external service, and then sent to the network service for processing.

Once processing is complete, the external service can transmit the result data back to the database, which is then converted from the second format back to the first format for query completion. Transforming between data formats can be completed by a third-party external service that is external to the database system and the requested external service of the query; however, configuring and maintaining a third-party data format transformation external service for each external service with which the database communicates can create a large amount of computational and network overhead. For instance, each external service can use its own format, and a transformation service is configured for each external service, which may be impractical from a resource perspective (e.g., computational and network overhead) and impractical from a user-experience perspective. Additionally, as the data managed by the database system grows, the user implementing the different third-party transformation services for the different external services further needs to verify and secure each service's authentication and security, and provision a correct amount of a computational device in the transformation service to efficiently transform the data and monitor all these configurations.

To solve the foregoing issues, an external function system can implement user-defined functions to efficiently interface with each external network service to process database data according to an external function query. In some example embodiments, an external user-defined function is generated and stored on a distributed database. Further, a serializer user-defined function and the deserializer user-defined function are generated and stored on the distributed database, and linked with the external function for execution when the external function is called via query. The serializer user-defined function can transform the queried database data from a format native to the database to a different format that is native to the external service, where each different external service may use different data formats. The external service can receive the data and perform the requested processing and return results data to the distributed database. The deserializer user-defined function can receive the returned data and convert the data from the format of the external service to the format of the distributed database, and the transformed data can be provided to the querying user as results data. Additionally, in some example embodiments, the serializer and deserializer user-defined functions are configured to alter or extend the functions of the external function without having to regenerate and re-authenticate the external user function.

In this way, the external function system can manage data format changes for different network services and extend the external functions' functionality without resorting to additional third-party external services to perform the processing. This enables the distributed database system to handle the external function security, provisioning, authentication, monitoring, and scaling of compute instances automatically, and remove the need for users to set up each of these features on different network services.

Additionally, the external function file system enables build out of new external function capabilities, and adjustments can be tested and debugged directly on the database, using the serializer and deserializer, and there is no need to "restart an external system" or intermediate transformation service each time a new adjustment or feature is included.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the database system 102 in communication with a cloud storage platform 104 (e.g., AWS®, Microsoft Azure Blob Storage®, or Google Cloud Storage). The database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the database system 102.

The database system 102 comprises a compute service manager 108, an execution platform 110, and one or more metadata databases 112. The database system 102 hosts and provides data reporting and analysis services to multiple client accounts.

The compute service manager 108 coordinates and manages operations of the database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources that execute various data storage and data retrieval tasks. The execution platform 110 is coupled to cloud storage platform 104. The cloud storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, and cloud storage platform 104 are shown in FIG. 1 as individual discrete components. However, each of the compute service manager 108, metadata database(s) 112, execution platform 110, and cloud storage platform 104 may be implemented as a distributed system (e.g., distributed across multiple systems/platforms at multiple geographic locations). Additionally, each of the compute service manager 108, metadata database(s) 112, execution platform 110, and cloud storage platform 104 can be scaled up or down (independently of one another) depending on changes to the requests received and the changing needs of the database system 102. Thus, in the described embodiments, the database system 102 is dynamic and supports regular changes to meet the current data processing needs.

During typical operation, the database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the cloud storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
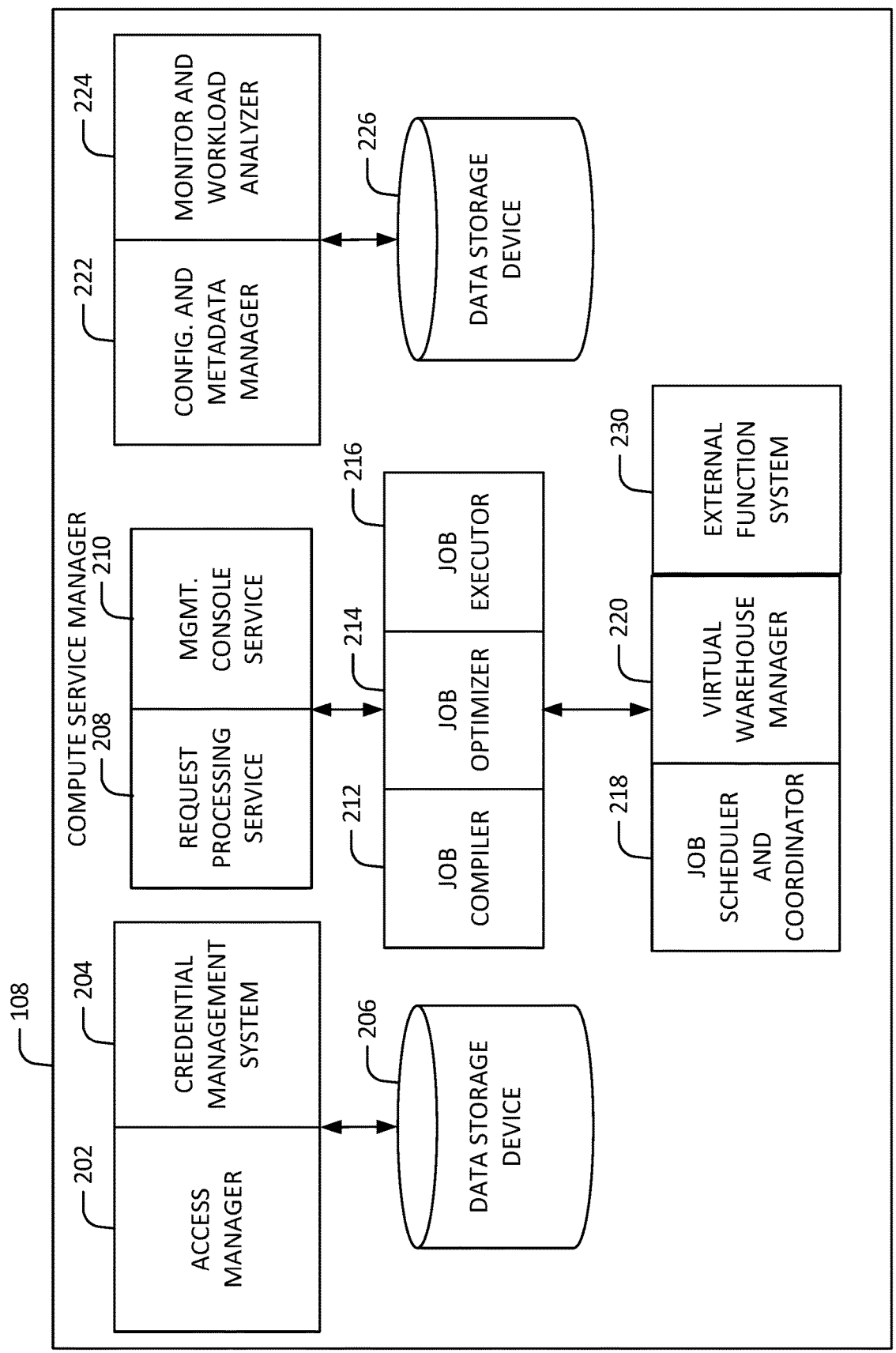
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to access metadata database 206, which is an example of the metadata database(s) 112. Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in cloud storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries. The external function system 230 is configured to manage external functions for data processing using an external network service that is external to the network-based database system 102, as discussed in further detail below. Although in FIG. 2 the external function system 230 is illustrated in the compute service manager 108, in some example embodiments, instances of the external function system 230 are implemented on execution nodes (XP nodes), e.g., for concurrent processing of portions of a queried dataset that is serialized and deserialized and processed using an external network service, as discussed in further detail below.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the database system 102. For example, data storage device 226 may represent buffers in execution platform 110, storage devices in cloud storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
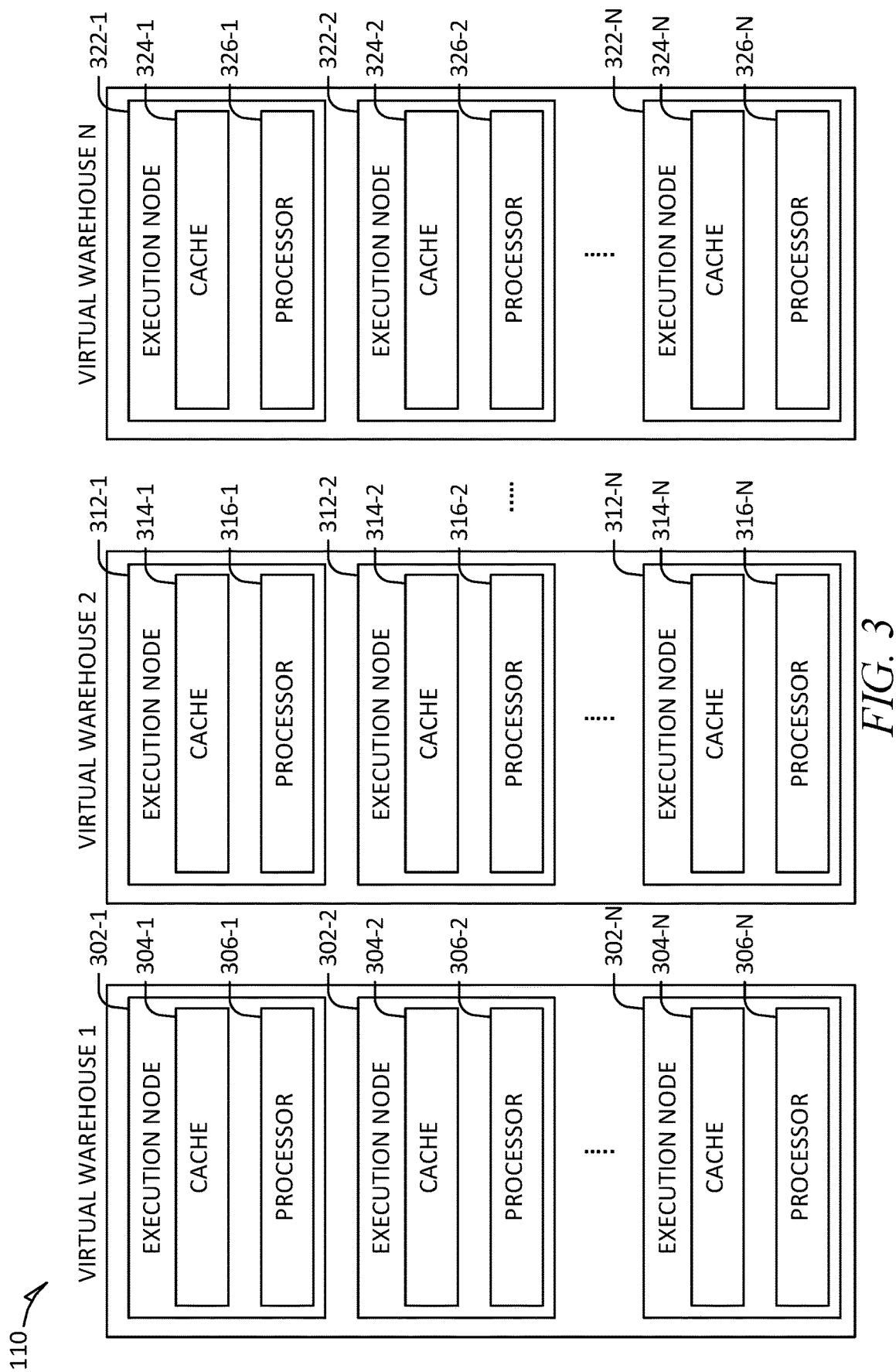
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer useful.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
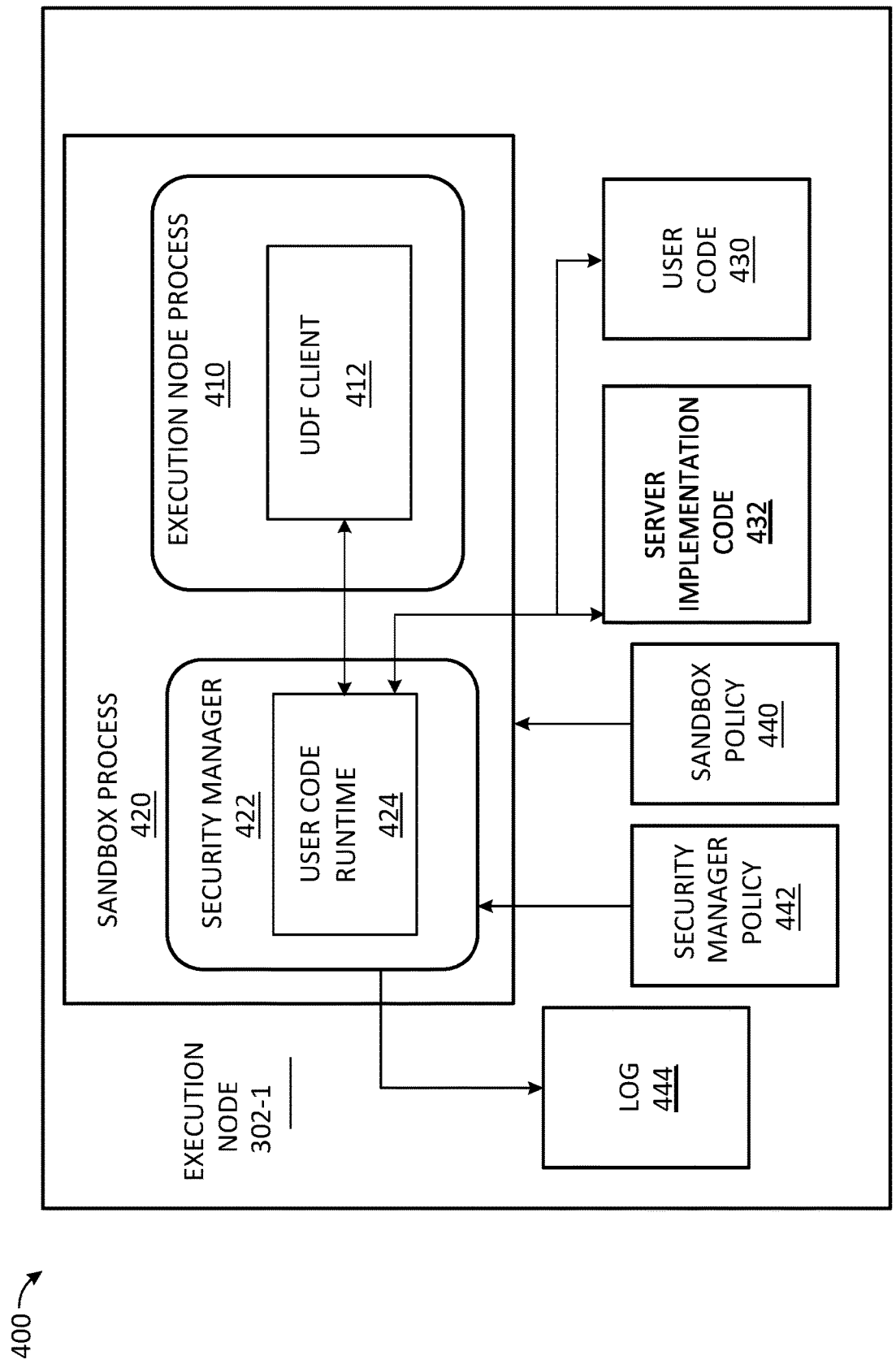
FIG. 4 is a computing environment conceptually illustrating an example software architecture executing a user-defined function (UDF) by a process running on a given execution node of the execution platform, in accordance with some embodiments of the present disclosure.

FIG. 4 is a computing environment 400 conceptually illustrating an example software architecture executing a user-defined function (UDF) by a process running on a given execution node of the execution platform 110, in accordance with some embodiments of the present disclosure.

As illustrated, the execution node 302-1 from the execution platform 110 includes an execution node process 410, which in an embodiment is running on the processor 306-1 and can also utilize memory from the cache 304-1 (or another memory device or storage). As mentioned herein, a "process" or "computing process" can refer to an instance of a computer program that is being executed by one or more threads by an execution node or execution platform.

As mentioned before, the compute service manager 108 validates all communication from the execution platform 110 to validate that the content and context of that communication are consistent with the task(s) known to be assigned to the execution platform 110. For example, the execution platform 110 executing a query A is not allowed to request access to a particular data source (e.g., data storage device 226 or any one of the storage devices in the cloud storage platform 104) that is not relevant to query A. In an example, the execution node 302-1 may need to communicate with a second execution node (e.g., execution node 302-2), but the security mechanisms described herein can disallow communication with a third execution node (e.g., execution node 312-1). Moreover, any such illicit communication can be recorded (e.g., in a log 444 or other location). Further, the information stored on a given execution node is restricted to data relevant to the current query and any other data is unusable by destruction or encryption where the key is unavailable.

The execution node process 410 is executing a UDF client 412 in the example of FIG. 4. In an embodiment, the UDF client 412 is implemented to support UDFs written in a particular programming language such as JAVA, and the like. In an embodiment, the UDF client 412 is implemented in a different programming language (e.g., C or C++) than the user code 430, which can further improve security of the computing environment 400 by using a different codebase (e.g., one with the same or fewer potential security exploits).

User code 430 may be provided as a package, e.g., in the form of a JAR (JAVA archive) file which includes code for one or more UDFs. Server implementation code 432, in an embodiment, is a JAR file that initiates a server which is responsible for receiving requests from the execution node process 410, assigning worker threads to execute user code, and returning the results, among other types of server tasks.

Figure 5:
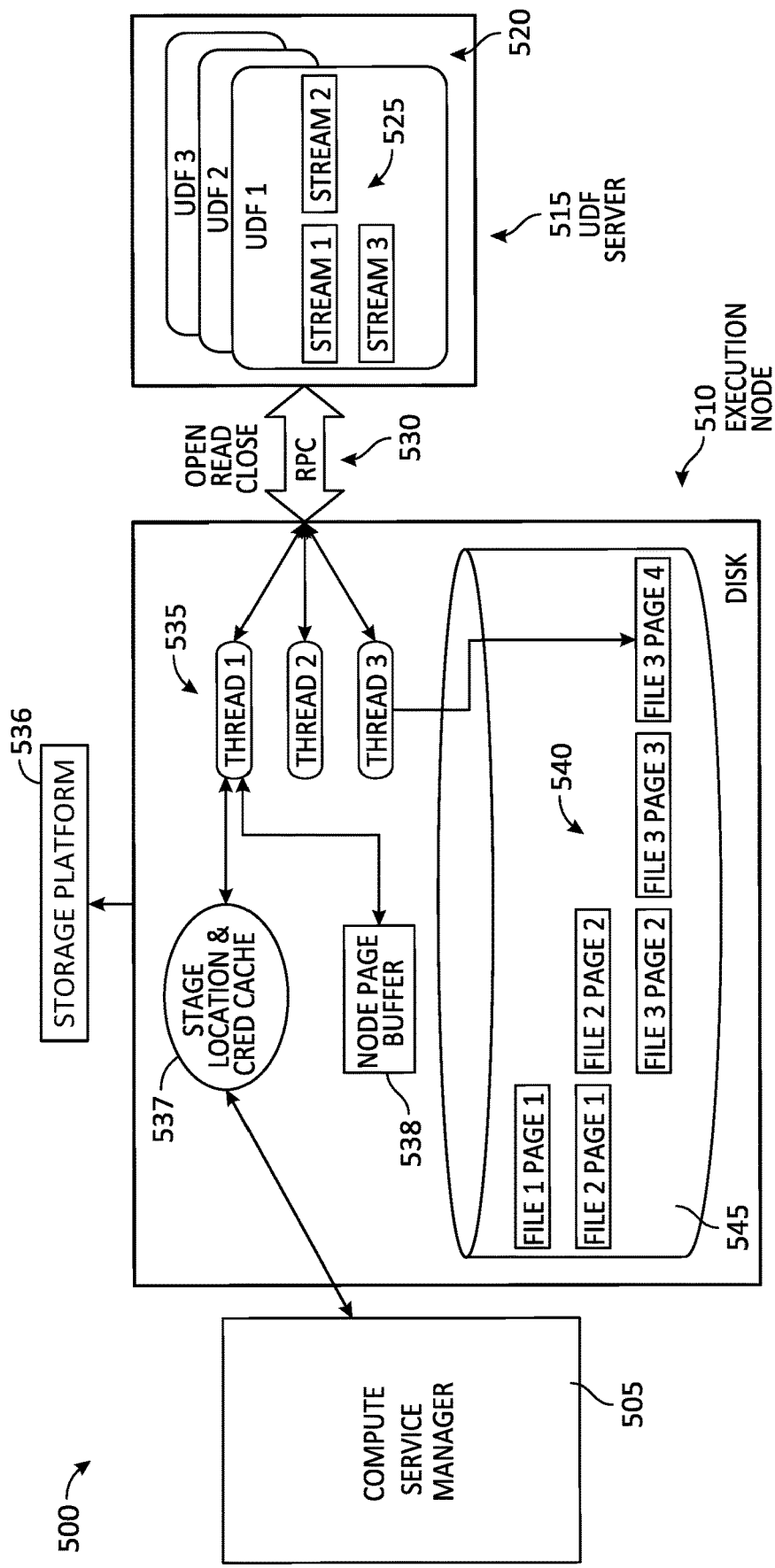
FIG. 5 shows a data architecture for implementing file access to UDFs in a staging location, in accordance with some embodiments of the present disclosure.

In an implementation, an operation from a UDF (e.g., JAVA-based UDF) can be performed by a user code runtime 424 executing within a sandbox process 420 (e.g., UDF server 515 shown in FIG. 5). In an embodiment, the user code runtime 424 is implemented as a virtual machine, such as a JAVA virtual machine (JVM). Since the user code runtime 424 executes in a separate process relative to the execution node process 410, there is a lower risk of manipulating the execution node process 410. Results of performing the operation, among other types of information or messages, can be stored in a log 444 for review and retrieval. In an embodiment, the log 444 can be stored locally in memory at the execution node 302-1, or at a separate location such as the cloud storage platform 104. Moreover, such results can be returned from the user code runtime 424 to the UDF client 412 utilizing a high-performance protocol (e.g., without serialization or deserialization of data, without memory copies; operates on record batches without having to access individual columns, records or cells; utilizes efficient remote procedure call techniques and network protocol(s) for data transfer) for data transfer (e.g., distributed datasets) that further provides authentication and encryption of the data transfer. In an embodiment, the UDF client 412 uses a data transport mechanism that supports a network transfer of columnar data between the user code runtime 424 (and vice-versa).

Security Manager 422, in an example, can prevent completion of an operation from a given UDF by throwing an exception (e.g., if the operation is not permitted), or returns (e.g., doing nothing) if the operation is permitted. In an implementation, the Security Manager 422 is implemented as a JAVA security manager object that allows applications to implement a security policy such as a security manager policy 442, and enables an application to determine, before performing a possibly unsafe or sensitive operation, what the operation is and whether it is being attempted in a security context that allows the operation to be performed. The security manager policy 442 can be implemented as a file with permissions that the user code runtime 424 is granted. The application (e.g., UDF executed by the user code runtime 424) therefore can allow or disallow the operation based at least in part on the security policy.

Sandbox process 420, in an embodiment, is a sub-process (or separate process) from the execution node process 410. A sub-process, in an embodiment, refers to a child process of a given parent process (e.g., in this example, the execution node process 410). The sandbox process 420, in an example, is a program that reduces the risk of security breaches by restricting the running environment of untrusted applications using security mechanisms such as namespaces and secure computing modes (e.g., using a system call filter to an executing process and all its descendants, thus reducing the attack surface of the kernel of a given operating system). Moreover, in an example, the sandbox process 420 is a lightweight process in comparison to the execution node process 410 and is optimized (e.g., closely coupled to security mechanisms of a given operating system kernel) to process a database query in a secure manner within the sandbox environment.

In an embodiment, the sandbox process 420 can utilize a virtual network connection in order to communicate with other components within the subject system. A specific set of rules can be configured for the virtual network connection with respect to other components of the subject system. For example, such rules for the virtual network connection can be configured for a particular UDF to restrict the locations (e.g., particular sites on the Internet or components that the UDF can communicate) that are accessible by operations performed by the UDF. Thus, in this example, the UDF can be denied access to particular network locations or sites on the Internet.

The sandbox process 420 can be understood as providing a constrained computing environment for a process (or processes) within the sandbox, where these constrained processes can be controlled and restricted to limit access to certain computing resources.

Examples of security mechanisms can include the implementation of namespaces in which each respective group of processes executing within the sandbox environment has access to respective computing resources (e.g., process IDs, hostnames, user IDs, file names, names associated with network access, and inter-process communication) that are not accessible to another group of processes (which may have access to a different group of resources not accessible by the former group of processes), other container implementations, and the like. By having the sandbox process 420 execute as a sub-process to the execution node process 410, in some embodiments, latency in processing a given database query can be substantially reduced (e.g., a reduction in latency by a factor of 10× in some instances) in comparison with other techniques that may utilize a virtual machine solution by itself.

As further illustrated, the sandbox process 420 can utilize a sandbox policy 440 to enforce a given security policy. The sandbox policy 440 can be a file with information related to a configuration of the sandbox process 420 and details regarding restrictions, if any, and permissions for accessing and utilizing system resources. Example restrictions can include restrictions to network access, or file system access (e.g., remapping file system to place files in different locations that may not be accessible, other files can be mounted in different locations, and the like). The sandbox process 420 restricts the memory and processor (e.g., CPU) usage of the user code runtime 424, ensuring that other operations on the same execution node can execute without running out of resources.

As mentioned above, the sandbox process 420 is a sub-process (or separate process) from the execution node process 410, which in practice means that the sandbox process 420 resides in a separate memory space than the execution node process 410. In an occurrence of a security breach in connection with the sandbox process 420 (e.g., by errant or malicious code from a given UDF), if arbitrary memory is accessed by a malicious actor, the data or information stored by the execution node process is protected.

Although the above discussion of FIG. 4 describes components that are implemented using JAVA (e.g., an object-oriented programming language), it is appreciated that the other programming languages (e.g., interpreted programming languages) are supported by the computing environment 400. In an embodiment, PYTHON is supported for implementing and executing UDFs in the computing environment 400. In this example, the user code runtime 424 can be replaced with a PYTHON interpreter for executing operations from UDFs (e.g., written in PYTHON) within the sandbox process 420.

FIG. 5 shows a data architecture 500 for implementing file access to UDFs in a staging location, according to some example embodiments. A UDF server 515 (e.g., a child process (sandbox process 420) of the XP process that runs a given execution node) can manage multiple UDFs 520 (e.g., UDF1, UDF2, UD3), each of which can be defined using a UDF signature (e.g., definition), discussed in further detail below. In accordance with some example embodiments, each UDF 520 manages one or more UDF interfaces (e.g., a base class of the programming language). For instance, UDF1 manages streams 525 (e.g., Java InputStreams), where the number of streams can be specified as a parameter of the function or application being specified by the end-user defining the UDF signature(s). For example, if a given UDF is a difference comparing function to compare two different files (e.g., File 2 Page 2; and File 3 Page 4), then two streams (e.g., Stream1 and Stream2) can be created to process the two files (e.g., via threads), in accordance with some example embodiments.

The UDF server 515 can open, read, or close requests to an execution node 510 (e.g., execution node 302-1) via a network interface channel 530, such as Remote Procedure Call (e.g., gRPC, Google Remote Procedure Call), to read a stage file, where the execution node (XP node) does the actual downloading of the files (e.g., if the files are not already local). In the execution node 510, threads 535 serve the requests received from the network interface channel 530, e.g., to perform concurrent processing of requested data. In some example embodiments, each of the threads 535 accesses location and authorization in a stage location and credential storage 537. For example, each thread identifies the passed-in stage data (e.g., "@path/file_name") and checks whether the files are local (e.g., on the disk 545), and if not, accesses the compute service manager 505 (e.g., compute service manager 108) to determine the location of the files of the stage data. In some example embodiments, the compute service manager 505 further determines whether a given thread has authorization to access files indicated by the stage data for the thread, and if so returns the location of the stage and credential data used to access the data (e.g., credential to an external stage location).

In some example embodiments, the threads use the received information of the stage location and credential storage 537 to access the storage device 536 (e.g., data storage device 120-1, cloud storage platform 104, object storage, S3 bucket) and then download the files piece by piece (e.g., as pages of a file), which are stored as pages 540 on local memory of the execution node 510 (e.g., disk 545). In some example embodiments, once downloaded, the threads then perform the processing of the files according to the UDF (e.g., parsing, metadata retrieval, field extraction). The downloaded files can be in any structure, such as structured data, unstructured data (e.g., images), where the UDF is configured (e.g., by a UDF developer, Java developer) to process the files such that both structured and unstructured data can be extracted and stored in a database table. For example, a user can write a UDF to extract metadata from image files and one Comma-Separated Value (CSV) file, and such that when implemented by the external function system 230, the UDF extracts metadata from the images, extracts rows and columns from the CSV and stores the data in a table of the network-based data warehouse system 102 without sending the data to external tools (e.g., Apache Spark) for processing. In this way, the author of the UDF (e.g., the user that generates the Java UDF file and specifies the UDF signature) can develop the UDF in the network-based database system 102 in an efficient and scalable approach. For example, a Java UDF can be developed, compiled, and debugged in any Java environment (e.g., in a local debugging environment on the UDF developer's computer), upload to the UDF server as a Java file, and then any other user (e.g., SQL caller, consumer users calling the UDF) can run the Java UDF as part of their regular database SQL execution.

Further, by implementing the external function system 230, the user that generates the Java UDF does not need to design it to scale. For example, if the amount of data to be processed is 1,000,000,000 files, the Java UDF does not need to be built to scale for the amount of files; rather, larger virtual warehouses (FIG. 3) can be instantiated and the scaling is handled by the native scaling (e.g., encryption, decryption of UDF specified files, compression/decompression, and compute instance allocation) of the network-based data warehouse system.

In some example embodiments, the files are downloaded as pages, where a page is a N size (e.g., 32 MB) chunk of the file. For example, 32 MB page size can be set as a parameter based on most files to be processed (e.g., 99%) having only one or two pages. In some example embodiments, during file downloading by the execution node, there is a node page buffer 538 (e.g., a page size buffer, a 32 MB memory buffer) that first cached with download data. When the node page buffer 538 is full, it is written to disk 545, and the node page buffer 538 will be filled with subsequent data, and so on for the subsequent files and chunks. In this way, a very large file will produce a series of 32 MB files on disk, but in over 99% of the cases there will just be one page of contents in memory which is then sent directly to the channel 530 (e.g., gRPC channel) for processing by the UDF file. In some example embodiments, even if there is just one page, it is still written to the disk 545 so that if other requests (of other threads in the node) want to read the file, the other requests just pull the file from the disk 545.

In some example embodiments, the next sequential pages are pre-cached in the node's cache (e.g., node page buffer 538). For example, UDF_1 can request Page2 of File3, and then to optimize performance, after a response is sent back to the UDF 1, the next pages (3 and 4) are downloaded (after access checking the computer service manage 505 to confirm access to those pages, as was done with Page2 of File 3, so that when a potential next request from UDF_1 is received requesting those pages, the thread just accesses the content from the local cache without going to the cloud, in accordance with some example embodiments.

Figure 6:
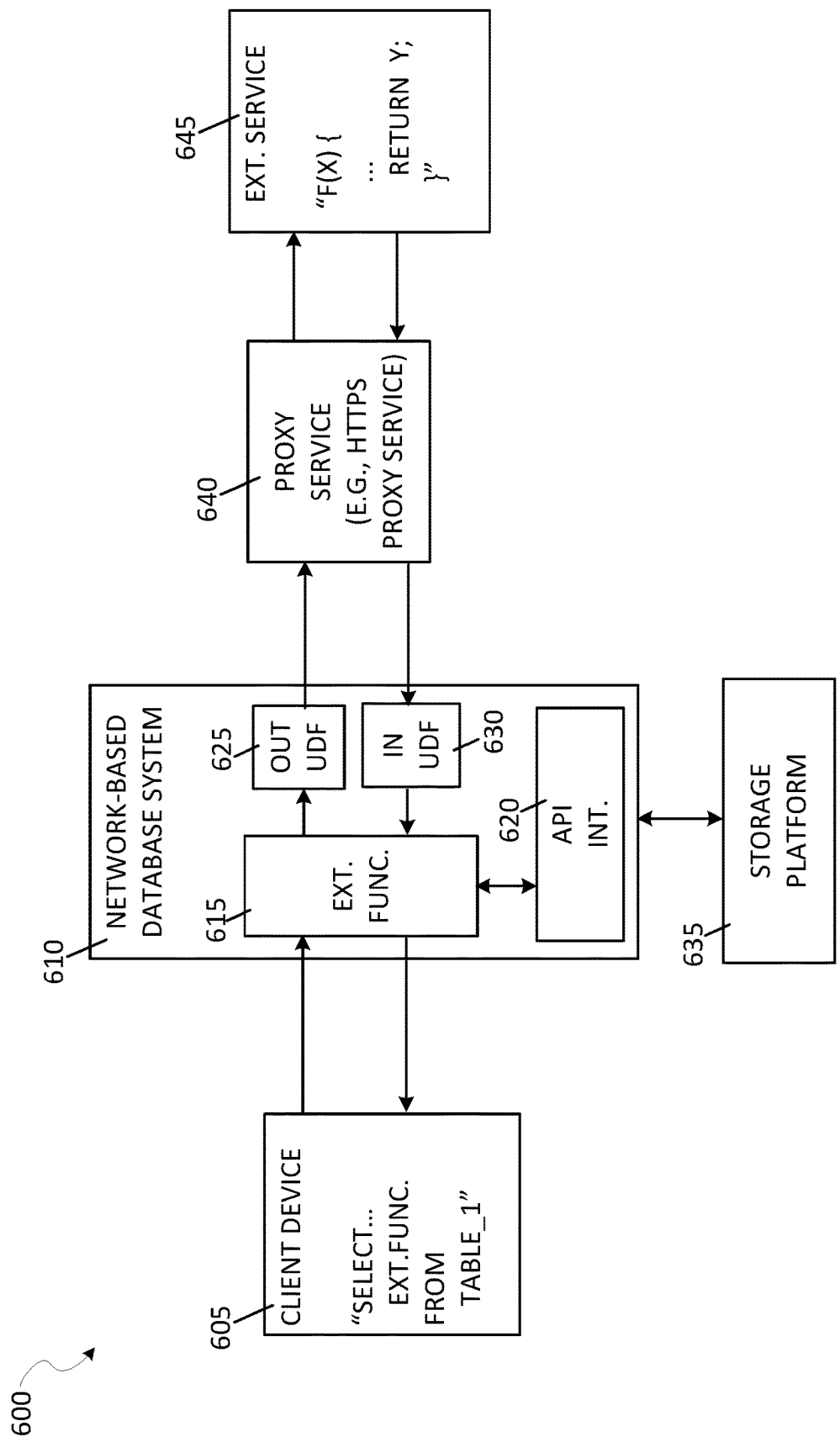
FIG. 6 shows an external function access system architecture, in accordance with some embodiments of the present disclosure.

FIG. 6 shows an external function access system architecture 600, according to some example embodiments. In the illustrated example, a client device 605 (e.g., client device 114) sends database statements comprising a call to an external function 615 (e.g., external user-defined function) to implement processing of the data in the storage platform 635 in an external service 645, such as a human language translation network service (e.g., Spanish to English, etc.), a sentiment analysis network service. In some example embodiments, the external function 615 is a UDF (e.g., UDF 1 in FIG. 5) stored by the network-based database system 610, and interfaces with a serializer user-defined function 625 (e.g., UDF 2 in FIG. 5) which serializes the data from the data format of the network-based database system 610 (e.g., proprietary JavaScript Object Notation (JSON) data format of the database) to the format of the external service 645 (e.g., a custom JSON format that is proprietary to the external service 645).

The data returned from the external service 645 is transformed using the deserializer user-defined function 630 (e.g., an inbound UDF file, UDF 3 in FIG. 5) from the data format of the external service 645 to the data format of the network-based database system 610. In some example embodiments, the data that is to be processed by the UDFs and the external service 645 is stored in the storage platform (e.g., storage device 536, FIG. 5), and then retrieved and stored in execution nodes for processing by the serializer user-defined function 625 and the deserializer user-defined function 630.

In some example embodiments, the network-based database system 610 does not call the external service 645 directly, and instead calls a proxy service 640 that is an API gateway service (e.g., Amazon API Gateway, Microsoft Azure API Management service) that sends and receives data directly from the external service 645. Further, in some example embodiments, the network-based database system 610 utilizes an API integration database object, such as API Integrate Object 620 that stores information (e.g., security information, credentials, addresses) that is used to work with the proxy service 640 and the external service 645.

In some example embodiments, the outbound serializer and inbound deserializer UDFs are written and stored as pairs, for use in processing data using a particular external service. For example, the serializer user-defined function 625 and the deserializer user-defined function 630 are written by a UDF developer and stored on the network-based database system 610 for use in transforming data to and from the external service 645. In some example embodiments, the external function, serializer, and deserializer are generated on the network-based database system 610 on a provider database account of a provider user (e.g., UDF developer), and the UDFs are shared with the consumer user for execution on the consumer database data using consumer-managed execution nodes (e.g., consumer account activated XP nodes that execute the external function UDF, serializer UDF, and deserializer UDF). Although a outbound serializer and inbound deserializer pair are discussed, as an example, in some example embodiments the database system implements an outbound serializer without an inbound deserializer (e.g., for one-directional outbound data), and further in some example embodiments, the database system implements an inbound deserializer without the outbound serializer (e.g., for one-directional inbound data).

In some example embodiments, the database system 610 calls the serializer user-defined function 625 and the deserializer user-defined function 630 automatically, in response to the external function 615 being called. For instance, the network-based database system 610 (e.g., the system 230 running in the network-based database system 610) calls the serializer user-defined function 625 and passes the database formatted data from the storage platform 635 into the serializer user-defined function 625. The transformed data output by the serializer user-defined function 625 is then transmitted to the external service 645. The external service 645 then performs the requested processing and sends back the returned data that is still in the native proprietary format of the external service 645. Upon receiving the returned data, the network-based database system 610 calls the deserializer user-defined function 630 to convert the data back to the format that is native to the network-based database system 610 (e.g., custom propriety JSON format of the network-based database system 610, from comma separated value (CSV) format to a different CSV format, from JSON format to CSV format, from a text (.txt) format to a different text format)). From the perspective of the user operating the client device 605, calling an external function with the serializer user-defined function 625 or the deserializer user-defined function 630 is the same as calling any other external function (e.g., the user specifies the external function in the query "SELECT" and the network-based database system 610 implements the serializer user-defined function 625 and the deserializer user-defined function 630 automatically).

Although in FIG. 6 only a single external service, a single external function, and a single pair of serializer and deserializer UDFs are illustrated, it is appreciated that a plurality of external services and a plurality of external functions and corresponding serializer/deserializer UDF pairs can be generated and managed by the external function access system architecture 600 to enable the database to efficiently interface with many different external network services.

Figure 7:
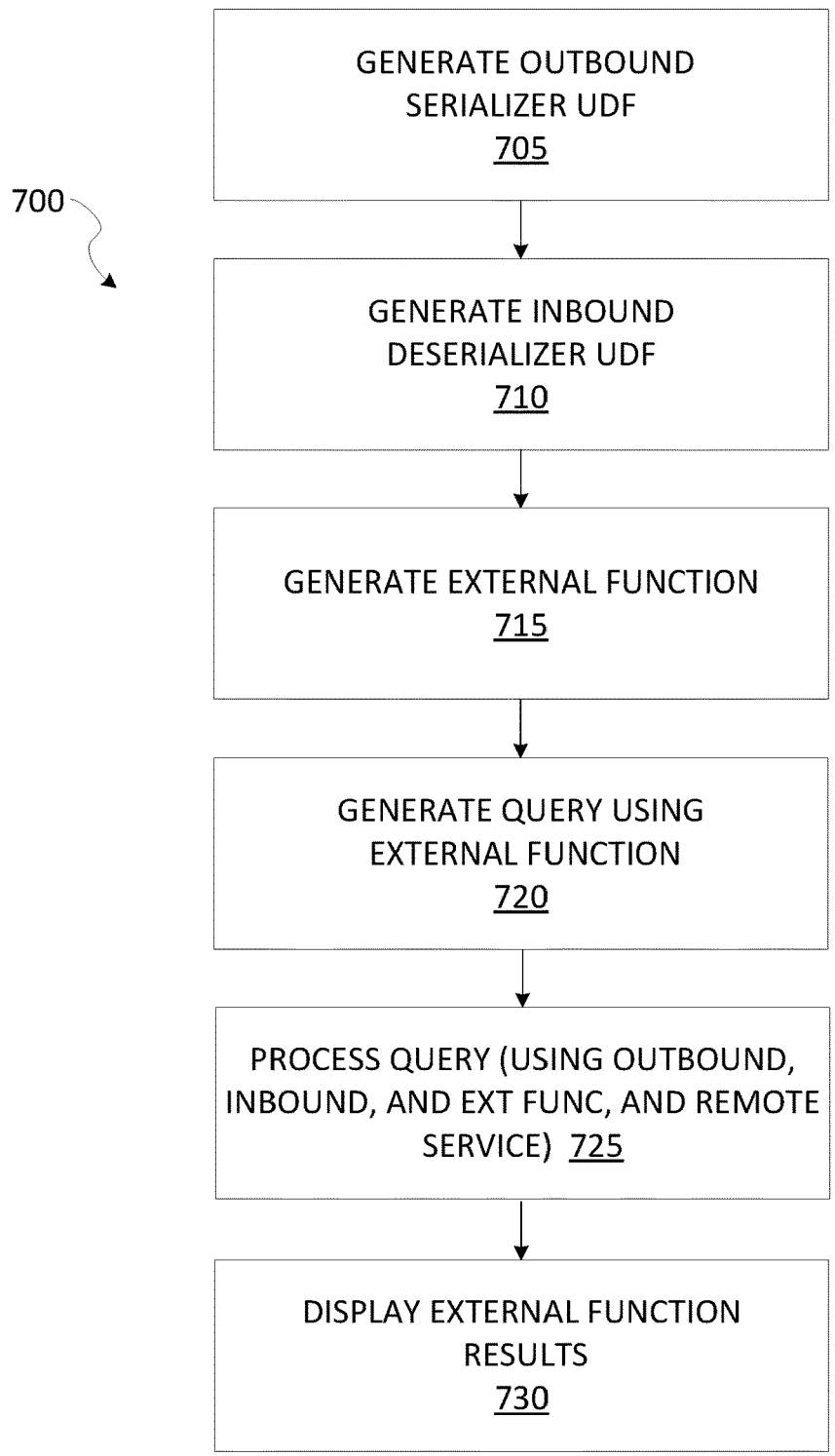
FIG. 7 shows a flow diagram of a method for implementing external function of a database system on an external service, in accordance with some embodiments of the present disclosure.

FIG. 7 shows a flow diagram of a method 700 for implementing external function of a database system on an external service that is external to the database system, according to some example embodiments. In the example of FIG. 7, the external service is a machine learning model that performs sentiment analysis on an input string of words to generate likelihoods of the potential sentiments of the input string (e.g., positive, negative). Although a sentiment analysis network service is discussed as an example, it is appreciated that a plurality of different network services (e.g., different HTTP services) can be implemented in a similar manner. Several examples of different network services that can be implemented, in accordance with some example embodiments, include: a language translation network service to translate database data from one language to another and vice versa (e.g., English to French, Spanish to English etc.), querying a remote database that is external the network-based database system 102, looking up data that is stored in private restricted databases (e.g., HIPAA-restricted information in private databases), proprietary data processing (e.g., credit scoring, fraud detection) that a user or organization prefers to keep external to the network-based database system 102, and other network service types.

At operation 705, the external function system 230 generates an outbound serializer UDF file. For example, the external function system 230 generates the serializer user-defined function 625 (e.g., UDF file) using code received from a UDF developer, and the serializer user-defined function 625 is then stored in the network-based database system 610. As discussed, the serializer user-defined function 625 receives input in the data format of the network-based database system 610 and converts it to the format that the external service can parse (e.g., a native data format, required and used by external service 645). As an example, the serializer user-defined function 625 is generated as shown below and stored as a UDF File (e.g., JavaScript file, JAR File):

::::::CODE::::::
CREATE OR REPLACE FUNCTION comprehendserializer_udf(event OBJECT)
RETURNS OBJECT LANGUAGE JAVASCRIPT AS
'var textlist=[ ]
for(i=0; i<EVENT.body.data.length; i++){
  let row=EVENT.body.data[i];
  //row[0] is the row number and row[1] is the input text.
textlist.push(row[1]); //put text into the textlist
}
//create the request for the service. Also pass the input request as part of the output.

return {"body": {"LanguageCode": "en", "TextList": textlist}, "serializerData": EVENT.body}
';
::::::CODE::::::

In the above example, the serializer user-defined function 625 loops through each of the input rows specified by the query. For each row, it adds the string, which is in row[1], to the textlist array. The value at row[0] is the row number and it can be ignored. The serializer returns a JSON body that has the language code and text list that matches the requirements of the external service. The serializer also returns data via the serializerData field, which is used by the deserializer user-defined function 630. In the above example, original input data is being sent to the external service 645 and the length of the input data is used in the deserializer user-defined function 630 so that the deserializer user-defined function 630 knows how many input requests were created, in accordance with some example embodiments.

The following is an example of data in the database format that is input into the serializer user-defined function 625:
::::::CODE::::::
{"body": {"data:" [[0, "I am so happy we got a sunny day for my birthday."], [1, "$$$$$."], [2, "Today is my last day in the old house."]]}}
::::::CODE::::::

Inputting the above database formatted code into the external service will yield errors and/or the processing may not function correctly or at all. In contrast, the code below is the output of the serializer UDF (upon being called when the external function is called), which is formatted in the format native to the external service:
::::::CODE::::::
"TextList": [
  "I am so happy we got a sunny day for my birthday.",
  "$$$$$.",
  "Today is my last day in the old house. "]},
"serializerData": {"data": [[0, "I am so happy we got a sunny day for my birthday."], [1, "$$$$$."], [2, "Today is my last day in the old house."]]}}
::::::CODE::::::

Continuing, at operation 710, the external function system 230 generates an inbound deserializer UDF file (e.g., using code provided by a UDF developer). For example, the external function system 230 generates the deserializer user-defined function 630 from code provided by a UDF developer, and then stores the deserializer user-defined function 630 in the network-based database system 610. As discussed, the deserializer processes the results that are received from the external service 645. In some example embodiments, errors are still generated, and the received results data comprises a combination of errors in an ErrorList (e.g., for queried data that did not complete processing successfully (e.g., the $$$ in this case was not recognized as an analyzable sentence)) and results in a ResultList (e.g., for queried data that completed processing successfully). In some example embodiments, the deserializer user-defined function 630 combines these results together to make a complete set that matches the order of the rows that were passed to the external service, and returns the result data in the format of the network-based database system 610. As an example, the deserializer user-defined function 630 is generated as shown below and stored as a UDF file (e.g., JavaScript file, JAR file) for execution in a runtime environment:

::::::CODE::::::
CREATE FUNCTION comprehenddeserializer_udf(event OBJECT)
RETURNS OBJECT LANGUAGE JAVASCRIPT AS
'//Combine the scored results and the errors into a single list.
var responses=new Array(EVENT.serializerData.data.length);
//output format: array of {
//"Sentiment": (POSITIVE, NEUTRAL, MIXED, NEGATIVE, or ERROR),
//"SentimentScore": <score>, "ErrorMessage": ErrorMessage}.
//If error, errorMessage is set, otherwise sentimentScore is set.
//Insert good results into proper position.
for(i=0; i<EVENT.body.ResultList.length; i++) let row=EVENT.body.ResultList[i]; let result=[row.Index, {"Sentiment": row. Sentiment, "SentimentScore": row. SentimentScore}] responses[row.Index]=result}
//Insert errors.
for(i=0; i<EVENT.body.ErrorList.length; i++) let row=EVENT.body.ErrorList[i]; let result=[row.Index, {"Sentiment": "Error", "ErrorMessage": row.ErrorMessage}] responses[row.Index]=result} return {"body": {"data": responses}};';
::::::CODE::::::

In the above example, the deserializer user-defined function 630 initializes an array called "responses" with the size of the input from the serializerData array length. The deserializer user-defined function 630 sends the serializerData to the deserializer user-defined function 630 to pass an original list of test strings. The deserializer user-defined function 630 loops through each of the non-error results and puts them into a result list. Next, the deserializer user-defined function 630 loops through the error results and puts them into the result list. The result list has an index position which indicates what entry it is. In some example embodiments, the order of the produced results must match the input order. The result list also contains the sentiment information. After all of the responses have been gathered, the deserializer user-defined function 630 returns the data in a specific native JSON format that is utilized by the processes of the network-based database system 610.

At operation 715, the external function system 230 generates an external function database object. For example, the deserializer user-defined function 630 stores the external function 615 in the network-based database system 610. In some example embodiments, the external function 615 is created using database statements that associate a specific serializer and deserializer pair to be activated when the external function is called. For example, the user of the client device 605 includes the serializer and deserializer clauses in a create external function statement:

::::::CODE::::::
CREATE EXTERNAL FUNCTION comprehendsentiment
//e.g., creates external function 615
  RETURNS OBJECT . . .
  serializer=comprehendserializer_udf //links serializer user-defined function 625 to external function 615
  deserializer=comprehenddeserializer_udf //specifies deserializer user-defined function 630 to external function 615
  AS<url_of_proxy_and_resource>;
::::::CODE::::::

Continuing, at operation 720, the external function system 230 generates a query that uses the external function. For example, the external function system 230 generates the query that uses an external function using code from input by a user of the client device 605. An example query of operation 720 includes:

::::::CODE::::::
"SELECT comprehendsentiment('Today is a good day');.
::::::CODE::::::

At operation 725, the external function system 230 processes the query. For example, the external function is called, which further calls the linked serializer user-defined function 625 to transform the data from the database format to the external service format. The transformed outbound data is then transmitted to the external service 645 via a gateway, such as proxy service 640. The external service 645 then performs the requested processing and returns the results data to the network-based database system 610 via the proxy service 640, which is then deserialized using the deserializer user-defined function 630. In some example embodiments, in addition to transforming the outbound and inbound data, the serializer user-defined function 625 and the 635 can extend and/or alter the functioning and features of the external function, and also change which data is sent to the gateway without regenerating the external function, as discussed in further detail below.

At operation 730, the external function system 230 displays the external function results. For example, the external results are displayed on the client device 605:

::::::CODE::::::
{"Sentiment": "POSITIVE",
"SentimentScore":{
 "Mixed":0.0024,
 "Negative":0.0014,
 "Neutral":0.0159,
 "Positive": 0.9801}}
::::::CODE::::::

In some example embodiments, the serializer user-defined function 625 and deserializer user-defined function 630 can be augmented with URL query parameters to extend the query processing of the external function. The external function 615 can have a URL that is fixed, and changing the external function 615 would require reauthoring the external function 615 and reconfiguring the proxy service 640 and external service 645 to work with the external function with dynamic query parameters. In some example embodiments, the serializer user-defined function 625 and deserializer user-defined function 630 include further functions that use parameters in the URL of the external function 615 (e.g., URL suffixes, tags after the "?" in a URL of the external function 615 to perform expanded query operations). In some example embodiments, the code of the serializer user-defined function 625 is configured to generate a specific URL with different query parameters in the URL that the proxy service 640 can interface with, thereby extending the type of processing completed by the external service 645. For example, the serializer user-defined function 625 can extend the URL of the external function 615 (e.g., adding on different aspects of the query such as flags to control it, as well additional query parameters).

In this way, the external function system 230 can implement the serializer user-defined function 625 and deserializer user-defined function 630 to alter the behavior of the external function without recreating the function. As an additional example, and in accordance with some example embodiments, the serializer user-defined function 625 and deserializer user-defined function 630 can dynamically change the API request to the external service 645 by changing the custom serializers without changing the external function that uses them (e.g., external function 615).

In some example embodiments, the system 230 implements the serializer user-defined function 625 and deserializer user-defined function 630 to change the HTTP call type used to interface with different network services. For example, instead of using all POST call types with the proxy service 640 and external service 645, the system 230 can implement the serializer user-defined function 625 and deserializer user-defined function 630 to change the call type (e.g., from POST to GET) at the network-based database system 610 instead of transforming the call type in the proxy service 640 or a third-party external service (e.g., intermediate computation layer, such as AWS Lambda or Azure Function).

In some example embodiments, the system 230 implements the serializer user-defined function 625 and the deserializer user-defined function 630 to set headers per a request. Some network services require that the headers be set per the request (e.g., set the headers per the request based on a dynamic configuration setting related to the particular data rows passed to the external service). To set headers in an efficient manner, the system 230 implements the serializer user-defined function 625 to set the headers. For example, the serializer user-defined function 625 can set headers that are related to certain optimizations (e.g., based on whether there are any null values in the request), or set headers to enable features or query aspects that are only to be implemented at certain times. In this way, the security of the external function 615 does not need to be adjusted since the external function 615 does not need to be regenerated to set or change headers. For instance, some network services require security configurations based on the specific ID of the created external function 615. As an example, in AWS IAM Role-based security, each time a given external function is recreated, the IAM Role-based security requires manually updating the "trust relationship" for an IAM role to allow the new function to operate.

Described implementations of the subject matter can include one or more features, alone or in combination as illustrated below by way of example.

Example 1. A method comprising: generating, on a distributed database, an external function to process data of the distributed database on an external network service that is external to the distributed database; generating, on the distributed database, a serializer function to serialize data that is input into the external function from a data format of the distributed database to a different data format of the external network service; generating, on the distributed database, a deserializer function to deserialize results data from the external network service from the different data format of the external network service to the data format of the distributed database; processing a query that calls the external function to process a dataset managed by the distributed database on the external network service, the processing of the query comprising applying the serializer function to generate an outbound dataset that is in the different data format of the external network service, the processing of the query further comprising transmitting the outbound dataset to the external network service; and providing, to a client device, a results dataset in response to the query, the results dataset being generated by applying the deserializer function to an inbound dataset that is received by the distributed database from the external network service, the external network service generating the inbound dataset by processing the outbound dataset according to the external function.

Example 2. The method of example 1, wherein the dataset is passed into the external function as a function parameter.

Example 3. The method of any of examples 1 or 2, wherein generating the external function comprises: associating the serializer function and the deserializer function with the external function.

Example 4. The method of any of examples 1-3, wherein calling the external function using the query automatically applies the serializer function to outbound query data that is outbound from the distributed database to the external network service.

Example 5. The method of any of examples 1-4, wherein calling the external function using the query automatically applies the deserializer function to inbound results data that is received by the distributed database from the external network service.

Example 6. The method of any of examples 1-5, wherein the query is generated by a consumer database.

Example 7. The method of any of examples 1-6, wherein the external function, the serializer function, and the deserializer function correspond to shared functions of a provider database that are shared with the consumer database.

Example 8. The method of any of examples 1-7, wherein the serializer function and the deserializer function are activated in a runtime environment on one or more of a plurality of execution nodes of the distributed database.

Example 9. The method of any of examples 1-8, wherein the plurality of execution nodes are managed by the consumer database.

Example 10. The method of any of examples 1-9, wherein: the serializer function comprises a first JavaScript file; and the deserializer function comprises a second JavaScript file; and the runtime environment comprises a JavaScript execution environment.

Example 11. The method of any of examples 1-10, wherein: the serializer function comprises a first Java Application Programming (JAR) file; and the deserializer function comprises a second JAR file; and the runtime environment comprises a Java Virtual Machine (JVM).

Example 12. A system comprising: one or more processors of a machine; and at least one memory storing instructions that, when executed by the one or more processors, cause the machine to perform operations implementing any of the methods of examples 1-11.

Example 13. A machine storage medium embodying instructions that, when executed by a machine, cause the machine to perform operations implementing any of the methods of examples 1-11.

Figure 8:
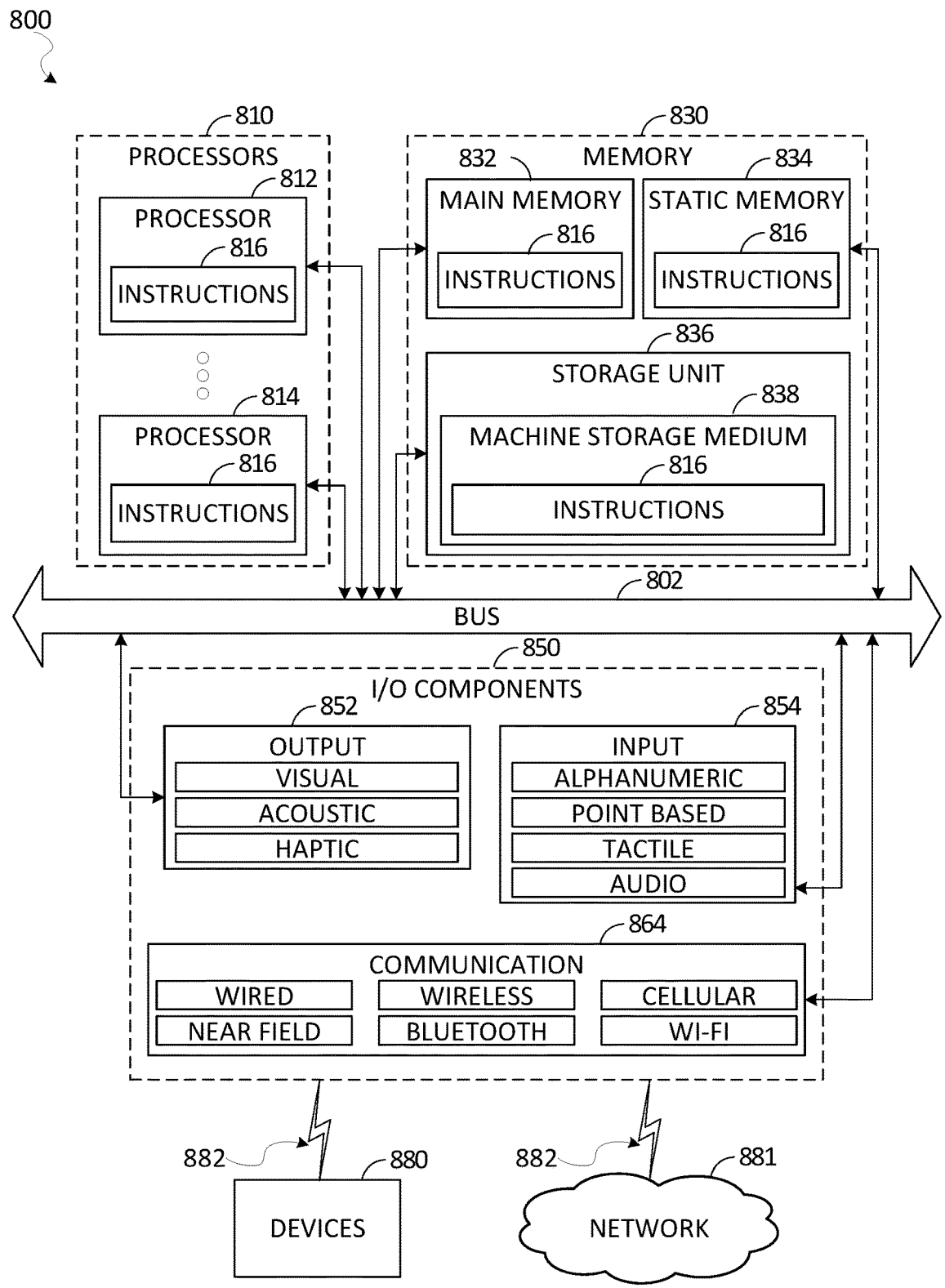
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of the method 700. As another example, the instructions 816 may cause the machine 800 to implement one or more portions of the methods of FIG. 7. In this way, the instructions 816 transform a general, non-programmed machine into a particular machine 800 (e.g., the compute service manager 108 or a node in the execution platform 110) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single one of the machines 800 is illustrated, the term "machine" shall also be taken to include a collection of machines 800 that individually or jointly execute the instructions 816 to perform any one or more of the methodologies discussed herein.

The machine 800 includes multi-core processors 810, memory 830, and input/output (I/O) components 850 configured to communicate with each other such as via a bus 802. In an example embodiment, the multi-core processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multi-core processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the multi-core processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within machine storage medium 838 of the storage unit 836, within at least one of the multi-core processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 881 or devices 880 via a coupling 882 and a coupling 882, respectively. For example, the communication components 864 may include a network interface component or another suitable device to interface with the network 881. In further examples, the communication components 864 may include wired communication components, wireless communication components, cellular communication components, and other communication components to provide communication via other modalities. The devices 880 may be another machine or any of a wide variety of peripheral devices (e.g., a peripheral device coupled via a universal serial bus (USB)). For example, as noted above, the machine 800 may correspond to any one of the compute service manager 108 or the execution platform 110, and the devices 880 may include the client device 114 or any other computing device described herein as being in communication with the database system 102 or the cloud storage platform 104.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 881 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 881 or a portion of the network 881 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 881 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 882 (e.g., a peer-to-peer coupling) to the devices 880. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 700 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations. In view of the disclosure above, various examples are set forth below. It should be noted that one or more features of an example, taken in isolation or combination, should be considered within the disclosure of this application.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
    identifying, on a distributed database, an external function to process data of the distributed database on an external network service that is external to the distributed database;
    receiving, from a provider database of the distributed database, a serializer shared function to serialize data that is input into the external function from a data format of the distributed database to a different data format of the external network service;
    receiving, from the provider database of the distributed database, a deserializer shared function to deserialize results data from the external network service from the different data format of the external network service to the data format of the distributed database, the serializer shared function and the deserializer shared function being shared functions of the distributed database that are shared from the provider database to a consumer database;
    generating, at the consumer database, a query that calls the external function to process a consumer database dataset on the external network service, the processing of the query comprising applying the serializer shared function to generate an outbound dataset that is in the different data format of the external network service, the processing of the query further comprising transmitting the outbound dataset to the external network service;
    based on the query, receiving an inbound dataset from the external network service, the external network service generating the inbound dataset by processing the outbound dataset according to the external function; and
    generating, at the consumer database, a results dataset by applying the deserializer shared function to the inbound dataset that is received from the external network service.

2. The method of claim 1, wherein the consumer database dataset is passed into the external function as a function parameter.

3. The method of claim 1, wherein generating the external function comprises: associating the serializer shared function and the deserializer shared function with the external function.

4. The method of claim 3, wherein calling the external function using the query automatically applies the serializer shared function to outbound query data that is outbound from the distributed database to the external network service.

5. The method of claim 4, wherein calling the external function using the query automatically applies the deserializer shared function to inbound results data that is received by the distributed database from the external network service.

6. The method of claim 1, wherein the query is generated by a client device of the consumer database.

7. The method of claim 6, further comprising: providing the results dataset to the client device of the consumer database.

8. The method of claim 1, wherein the serializer shared function and the deserializer shared function are activated in a runtime environment on one or more of a plurality of execution nodes of the distributed database.

9. The method of claim 8, wherein the plurality of execution nodes are managed by the consumer database.

10. The method of claim 8, wherein:
the serializer shared function comprises a first JavaScript file; and the deserializer shared function comprises a second JavaScript file; and
the runtime environment comprises a JavaScript execution environment.

11. The method of claim 8, wherein: the serializer shared function comprises a first Java Application Programming (JAR) file; and
the deserializer shared function comprises a second JAR file; and
the runtime environment comprises a Java Virtual Machine (JVM).

12. A system comprising:
one or more processors of a machine; and
at least one memory storing instructions that, when executed by the one or more processors, cause the machine to perform operations comprising:
identifying, on a distributed database, an external function to process data of the distributed database on an external network service that is external to the distributed database;
receiving, from a provider database of the distributed database, a serializer shared function to serialize data that is input into the external function from a data format of the distributed database to a different data format of the external network service;
receiving, from the provider database of the distributed database, a deserializer shared function to deserialize results data from the external network service from the different data format of the external network service to the data format of the distributed database, the serializer shared function and the deserializer shared function being shared functions of the distributed database that are shared from the provider database to a consumer database;
generating, at the consumer database, a query that calls the external function to process a consumer database dataset on the external network service, the processing of the query comprising applying the serializer shared function to generate an outbound dataset that is in the different data format of the external network service, the processing of the query further comprising transmitting the outbound dataset to the external network service;
based on the query, receiving an inbound dataset from the external network service, the external network service generating the inbound dataset by processing the outbound dataset according to the external function; and
generating, at the consumer database, a results dataset by applying the deserializer shared function to the inbound dataset that is received from the external network service.

13. The system of claim 12, wherein the consumer database dataset is passed into the external function as a function parameter.

14. The system of claim 12, wherein generating the external function comprises: associating the serializer shared function and the deserializer shared function with the external function.

15. The system of claim 14, wherein calling the external function using the query automatically applies the serializer shared function to outbound query data that is outbound from the distributed database to the external network service.

16. The system of claim 15, wherein calling the external function using the query automatically applies the deserializer shared function to inbound results data that is received by the distributed database from the external network service.

17. The system of claim 12, wherein the query is generated by a client device of the consumer database.

18. The system of claim 17, the operations further comprising: providing the results dataset to the client device of the consumer database.

19. The system of claim 12, wherein the serializer shared function and the deserializer shared function are activated in a runtime environment on one or more of a plurality of execution nodes of the distributed database.

20. The system of claim 19, wherein the plurality of execution nodes are managed by the consumer database.

21. The system of claim 19, wherein:
the serializer shared function comprises a first JavaScript file; and the deserializer shared function comprises a second JavaScript file;, and
the runtime environment comprises a JavaScript execution environment.

22. The system of claim 19, wherein: the serializer shared function comprises a first Java Application Programming (JAR) file; and
the deserializer shared function comprises a second JAR file; and
the runtime environment comprises a Java Virtual Machine (JVM).

23. A machine storage medium embodying instructions that, when executed by a machine, cause the machine to perform operations comprising:
identifying, on a distributed database, an external function to process data of the distributed database on an external network service that is external to the distributed database;
receiving, from a provider database of the distributed database, a serializer shared function to serialize data that is input into the external function from a data format of the distributed database to a different data format of the external network service;
receiving, from the provider database of the distributed database, a deserializer shared function to deserialize results data from the external network service from the different data format of the external network service to the data format of the distributed database, the serializer shared function and the deserializer shared function being shared functions of the distributed database that are shared by the provider database to a consumer database;
generating, at the consumer database, a query that calls the external function to process a consumer database dataset on the external network service, the processing of the query comprising applying the serializer shared function to generate an outbound dataset that is in the different data format of the external network service, the processing of the query further comprising transmitting the outbound dataset to the external network service;
based on the query, receiving an inbound dataset from the external network service, the external network service generating the inbound dataset by processing the outbound dataset according to the external function; and
generating, at the consumer database, a results dataset by applying the deserializer shared function to the inbound dataset that is received from the external network service.

24. The machine storage medium of claim 23, wherein the consumer database dataset is passed into the external function as a function parameter.

25. The machine storage medium of claim 23, wherein generating the external function comprises:
   associating the serializer shared function and the deserializer shared function with the external function.

26. The machine storage medium of claim 25, wherein calling the external function using the query automatically applies the serializer shared function to outbound query data that is outbound from the distributed database to the external network service.

27. The machine storage medium of claim 26, wherein calling the external function using the query automatically applies the deserializer shared function to inbound results data that is received by the distributed database from the external network service.

28. The machine storage medium of claim 23, wherein the query is generated by a client device of the consumer database.

29. The machine storage medium of claim 28, the operations further comprising: providing the results dataset to the client device of the consumer database.

30. The machine storage medium of claim 23, wherein the serializer shared function and the deserializer shared function are activated in a runtime environment on one or more of a plurality of execution nodes of the distributed database.

* * * * *

UNITED STATES PATENT AND TRADEMARK OFFICE
CERTIFICATE OF CORRECTION

PATENT NO. : 11,403,298 B1
APPLICATION NO. : 17/514095
DATED : August 2, 2022
INVENTOR(S) : Brossard et al.

Page 1 of 1

It is certified that error appears in the above-identified patent and that said Letters Patent is hereby corrected as shown below:

In the Claims

In Column 28, Line 19, in Claim 21, delete "file;," and insert --file;-- therefor Signed and Sealed this
Second Day of May, 2023

Katherine Kelly Vidal
*Director of the United States Patent and Trademark Office*